(12) United States Patent
Boast (10) Patent No.: US 7,540,258 B2
(45) Date of Patent: Jun. 2, 2009

(54) MILKING APPARATUS AND METHOD WITH TRANSVERSELY STRETCHED MEMBRANES

(75) Inventor: David Boast, Chippenham (GB)

(73) Assignee: Avon Polymer Products Limited, Wiltshire (GB)

( * ) Notice: Subject to any disclaimer, the term of this patent is extended or adjusted under 35 U.S.C. 154(b) by 0 days.

(21) Appl. No.: 11/252,268

(22) Filed: Oct. 17, 2005

(65) Prior Publication Data

US 2006/0196429 A1    Sep. 7, 2006

(30) Foreign Application Priority Data

Oct. 18, 2004    (GB)    ............... 0423132.0

(51) Int. Cl.
*A01J 5/04*    (2006.01)
*A01J 3/00*    (2006.01)

(52) U.S. Cl. ................. 119/14.49; 119/14.02

(58) Field of Classification Search ... 119/14.47–14.49, 119/14.53, 14.52, 14.31, 14.02
See application file for complete search history.

(56) References Cited

U.S. PATENT DOCUMENTS

| | | | |
|---|---|---|---|
| 1,430,191 A | | 9/1922 | Rutherford |
| 2,470,169 A | * | 5/1949 | Howse ............... 119/14.25 |
| 2,502,362 A | | 3/1950 | Babson et al. |
| 2,997,980 A | | 8/1961 | Noorlander |
| 3,659,558 A | | 5/1972 | Noorlander |
| 3,845,743 A | | 11/1974 | Van Staveren |
| 3,874,338 A | * | 4/1975 | Happel ............... 119/14.53 |
| 4,249,481 A | * | 2/1981 | Adams ............... 119/14.02 |
| 4,332,215 A | * | 6/1982 | Larson ............... 119/14.49 |
| 5,069,162 A | | 12/1991 | Thompson et al. |
| 6,039,001 A | * | 3/2000 | Sanford ............... 119/14.47 |
| 6,427,624 B1 | | 8/2002 | Briggs |
| 6,435,132 B1 | * | 8/2002 | Milbrath et al. ......... 119/14.47 |
| 6,546,893 B1 | * | 4/2003 | Happel et al. .......... 119/14.47 |
| 6,588,364 B1 | * | 7/2003 | Petterson ............... 119/14.47 |
| 6,631,694 B1 | | 10/2003 | Chowdhury |
| 6,745,718 B1 | | 6/2004 | Chowdhury |
| 6,755,153 B1 | | 6/2004 | Chowdhury |
| 6,776,120 B1 | | 8/2004 | Chowdhury |
| 6,796,272 B1 | * | 9/2004 | Chowdhury ............ 119/14.47 |
| 6,997,136 B1 | * | 2/2006 | Coates ............... 119/14.47 |

FOREIGN PATENT DOCUMENTS

| | | | |
|---|---|---|---|
| EP | 105206 A1 * | 4/1984 | |
| WO | 00/76300 | 12/2000 | |
| WO | WO 2004056174 A1 * | 7/2004 | |

* cited by examiner

*Primary Examiner*—Michael R Mansen
*Assistant Examiner*—Joshua J Michener
(74) *Attorney, Agent, or Firm*—McGarry Bair PC (57) ABSTRACT

Apparatus for removing milk from a teat of an animal comprising an outer body having an opening into which the teat is insertable into a space defined by two or more resilient membranes. A pressure difference is applied between the space between the resilient membranes and a region outside the membranes to cause the membranes to ball on to the teat, thereby massaging it to extract milk. To avoid exerting excessive force on the end of the teat yet retain a useful massage pressure, the resilient membranes are under tension in a direction transverse to the direction of teat insertion before the provision of any pressure difference (before the insertion of the teat).

19 Claims, 8 Drawing Sheets

MILKING APPARATUS AND METHOD WITH TRANSVERSELY STRETCHED MEMBRANES

CROSS-REFERENCE TO RELATED APPLICATION

This application claims the benefit of GB Application No. 0423132.0, filed Oct. 18, 2004, which is incorporated herein in its entirety.

BACKGROUND OF THE INVENTION

1. Field of the Invention

The present invention relates to a milking apparatus, i.e. an apparatus for removing milk from a teat of an animal. It also relates to a method of use of such an apparatus.

2. Summary of the Prior Art

In a conventional milking apparatus, a cylindrical liner of resilient material is housed within an outer body, and the liner is tensioned along the axis of the cylinder. The teat of the animal is then inserted through an opening in the body into the cylindrical liner, and then suction is applied to another opening in the body, at the other end of the cylindrical liner to that in which the teat is inserted, to create a partial vacuum. This causes the liner to contract around the teat, and so causes milk to be expressed from the teat. Because of the suction, the liner closes on the teat, so providing relief from the suction. Such milking apparatuses have been known for around 100 years, and although many modifications to the basic arrangement have been suggested, such as the application of an over pressure around the liner, as well as suction, the basic arrangement has stayed the same. Thus, the basic liner arrangement disclosed in e.g. GB270316, published in 1927, are not dissimilar from e.g. U.S. Pat. No. 6,427,624 published in 2002.

SUMMARY OF THE INVENTION

However, in all the time that such milking apparatuses have been used, little thought seems to have been given to the precise effect of the forces that are generated. The liner is the only part of the milking apparatus that applies forces to the teat, and while these forces are low, they are repeated many times and therefore have a significant effect on the teat. However, the forces are complicated as both the liner and the teat are resilient. The forces are therefore complex.

Initially, the teat is exposed to the suction of the milking apparatus, and this exerts a downward force on the teat, particularly the teat end. As a result of this, the tissue of the teat can fill excessively with fluid, since the suction forces are around −40 kPa relative to atmospheric pressure. Then, as the liner closes around the teat, the liner will exert a pressure on the teat. However, basic membrane theory indicates that the tension in a membrane is equal to the pressure exerted by that membrane multiplied by its radius of curvature, and that means that the teat contact pressure is equal to the tension in the liner divided by the radius of curvature of the liner. Since the liner will conform to the teat, its radius of curvature is minimum at the end of the teat, so the membrane contact pressure is maximum at that end. Away from the teat end, the curvature is less, and therefore the contact pressure is less.

Thus, in the known arrangements, the maximum teat contact pressure is exerted at the teat end, and therefore it has been realised that the existing milking apparatuses involve a compromise. If the tension is large, the forces generated at the teat end may damage the teat. However, if the tension is low, to avoid such damage, then the pressure applied on the teat away from the teat end (along the teat 'barrel') is small. In practice, since it is important to avoid damage to the teat, existing arrangements have, in fact, exerted only a small pressure on the teat, except at the teat end.

Therefore it has been realised by the inventor that the milking action is almost entirely governed by pressure at the teat end. Thus, the milking action of the known apparatuses do not make use of the full length of the teat which is inserted within the liner.

As has been mentioned above, existing liner arrangements put the liner under axial tension, the liner being stretched within the outer body.

At its most general, the present invention proposes that milking apparatus be provided with membranes which are placed under transverse tension, i.e. tension in a direction generally perpendicular to the direction of elongation of the barrel of the teat. It has been found that such an arrangement with transverse tension enables pressure (pressing into the teat barrel) to be applied to the part of the teat other than the end, without pressure at the teat end being excessive.

Thus, the present invention may provide apparatus for removing milk from the teat of an animal, comprising: an outer body having an opening therein into which the teat is insertable in a first direction; at least two resilient membranes within the body, the membranes forming a space therebetween into which the teat is receivable when it is inserted into the opening, the membranes being arranged to be under tension in a direction transverse to said first direction when there is the same pressure across the membranes; and a pressure generating device for applying a pressure difference across the membranes. The transverse tension is therefore present before the teat is inserted. In this way, the primary mechanism for providing the massage force to the teat is by membrane theory through the transverse tension experienced by the membranes. Other effects, such as bending etc., may be important but are small. The pressure generating device may apply a pressure difference by creating a pressure gradient through the plane of each membrane.

Preferably, the space formed by the membranes is a closed space sealed within the outer body. For example, the membranes may extend between fixed attachment points within the body. The attachment points are preferably spaced transverse to the first direction away from the interior walls of the outer body. This enables the closed space defined by the membranes to surrounded by a common region, i.e. the pressure in the common region will be the pressure experienced by the outer surface of all membranes.

The fixed attachment points may be rods extending in the first direction, the resilient membranes being transversely stretched between rods to put them under transverse tension. Accordingly, in another independent aspect of the invention, there may be provided apparatus for removing milk from the teat of an animal, comprising: an outer body having an opening therein into which the teat is insertable in a first direction;

at least two membranes forming a space therebetween into which the teat is receivable when it is inserted into the opening; and a pressure generating device for applying a pressure difference across the membranes, wherein the membranes extend between attachment rods which are mounted within the outer body and extend substantially in the first direction, the rods being spaced transversely away from i.e. not in sealing contact with, the interior walls of the outer body along the majority or all of the axial extent (length in the first direction) of the rods. The rods may be attached to or mounted on the outer body at either or both of their ends.

The resilient membranes may be put under axial tension (i.e. tension in the first direction), as well as transverse tension, if it is found that there needs to be a greater pressure on the teat end than on the part of the teat remote from the end. Each membrane can therefore effectively be tuned to the shape of a teat. Such tuning allows improved control over the pressures (forces) exerted on the teat and therefore may be used to ensure that teat health is kept to an optimum.

It is possible for the present invention to be embodied using only two resilient membranes, arranged generally parallel to each other. However, preferably there are three membranes, joined together to form a triangular cross-section. The teat is then inserted between the membranes, perpendicular to the plane of such triangle. Then, the pressure difference closes the membranes on the teat. Four or more membranes may be used.

The membranes may be part of a one piece liner mounted inside the outer body. For example, there may be three upstanding rods mounted in the outer body on which a liner is moulded such that three membranes stretch between the rods to form a triangle when viewed in cross section.

Normally, the space between the membranes will be subject to suction, in a way similar to the interior of known liners. However, it is possible in addition to provide an over-pressure between the outside of the membranes and the interior of the body into which the membranes are received, since it is believed that such a positive pressure is of beneficial effect. Where a common region surrounding the membranes is used as described above, the same pressure can easily be applied to the outside of all membranes. Furthermore, it is possible to use only over pressure without suction being applied to the interior of the liner.

Whilst the membranes may be of uniform thickness, it is possible for their thickness to vary, since that will vary the tension and hence the pressure exerted on the teat, along the length of the teat. Preferably, the transverse tension in the liner is relatively low, so that when the liner closes on the teat, it mimics the action of a suckling calf. Preferably, the membranes are made from a low modulus rubber. The average wall thickness is preferably low, e.g. less than 1.5 mm, preferably less than 1.3 mm. Additionally or alternatively, the modulus of the material (preferably rubber) of the membranes may also be low, in order achieve the desired low tension. Preferably, the shear modulus of the material is 0.8 $MNm^{-2}$ or less.

Preferably, the thickness and/or shear modulus value of the membranes varies in the axial (first) direction. The pressure distribution effected by the membranes on the teat depends on membrane thickness and shear modulus, so the pressure distribution can be matched to the shape of a teat. Thus, liners tailored to specific shapes of teat may be made. For instance, cows can have conical teats, parallel teats and barrel shaped teats. Goats and sheep also have shapes where more or less tension may need to be applied to a particular part of the teat. Also, a cow may have three teats of one shape and of another a different shape, all on the same udder. The present invention may allow teat liners to be designed to deal with such situations.

In a development of the present invention, the apparatus is adapted to reduce the forces experienced by parts of the animal adjacent the opening in the outer body caused by the pressure difference between the space for the teat and the region outside the membranes. In particular, this development aims to mimic more closely the forces a teat would experience from a suckling calf.

Thus, the membranes are preferably divided into two or more sub-membranes so that the membranes form a set of chambers surrounding said space, each chamber having one or more sub-membranes facing said space. The pressure generating device may be arranged to provide an independently controllable pressure difference for each chamber. The chambers may therefore be independently operable, e.g. in a user-determined sequence. This therefore allows different parts of the membrane surface to press against the teat at different times.

Preferably, the membranes are divided to form a set of two or more chambers along the first direction.

To form the chambers, the membranes are preferably divided into sub-membranes by dividing the region outside the membranes, e.g. between the membranes and the inside of the outer body. The dividing may be achieved by transverse resilient webs extending between each membrane and the inside surface of the outer body. In the triangular cross section arrangement described above, each chamber may extend completely around the membranes. Alternatively or additionally, dividing webs extending in the first (axial) direction may also be provided, so that the separate walls of each chamber may be individually controllable.

The transversely extending webs may be integral with or attached to the membranes. Preferably, the webs are attached to the inside surface of the outer body by a clamp or other attachment.

The pressure generating device is preferably arranged to provide an overpressure to each chamber, to increase the control of pressure exerted on the teat.

There may be two or more chambers. Preferably, the chambers are pressurised in sequence e.g. along the first direction. This mimics the peristaltic action of a suckling calf. The more chambers there are, the more peristaltic the sequential action becomes. Other sequences of pressurising the chambers are also possible.

Although, the present invention has been discussed above in terms of apparatus for removing milk from the teat of an animal, the present invention also relates to a method of removing milk, in which the teat is inserted between the resilient membranes of the apparatus and a pressure difference generated across those membranes that cause the membranes to fall onto the teat. The method aspect may include ways of sequentially pressurising the independent chambers defined above.

BRIEF DESCRIPTION OF THE DRAWINGS

Embodiments of the present invention will now be described in detail, by way of example, with reference to the accompanying drawings, in which.

DETAILED DESCRIPTION

Figure 1A:
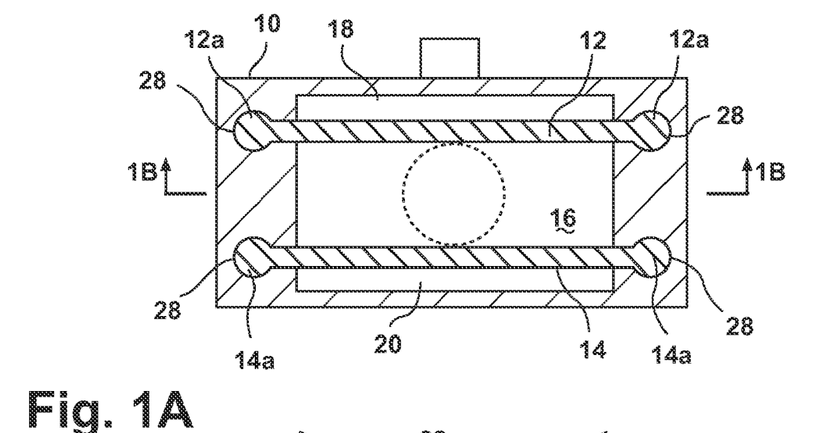
FIGS. 1A and 1B are the first embodiment of the present invention, before the application of suction, FIG. 1A being the transverse section along the line 1A-1A, in FIG. 1B, FIG. 1B being a longitudinal section along the line 1B-1B in FIG. 1A.
Figure 1B:
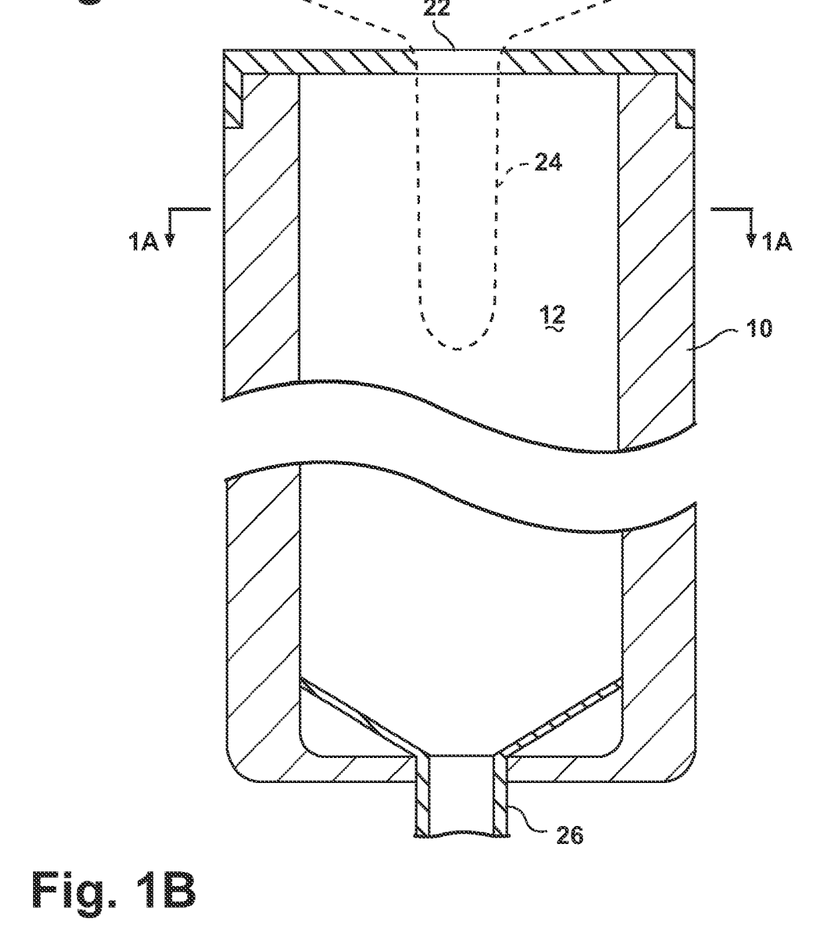

Referring first to FIGS. 1A and 1B, a milking apparatus comprises an outer body 10, the interior of which is hollow and which contains two membranes 12, 14. As can be seen from FIG. 1A, the membranes 12, 14 are generally parallel to define a space 16 therebetween, and respective spaces 18, 20 between the membranes 12, 14 and the body 10. The body 10 has an opening 22 at its upper end, aligned with the space 16, into which a teat 24 of e.g. a cow may be received. At the end of the body 10 remote from the opening 22 is a suction outlet 26 which is connected to a vacuum apparatus for generating a reduced pressure within the space 16.

The membranes 12, 14 are put under transverse tension, i.e. tension in the plane of the view of FIG. 1A. This can be achieved by providing ribs 12a, 14a on the longitudinal edges of the membranes 12, 14, those ribs 12a, 14a being received in corresponding bores 28 in the body 10, to hold the membranes 12, 14 in place. If the separation of the bores 28 in the transverse direction is slightly greater than the relaxed transverse separation of the ribs 12a, 14a the membranes 12, 14 will be under tension when the ribs 12a, 14a are mounted in the bores 28.

Figure 2A:
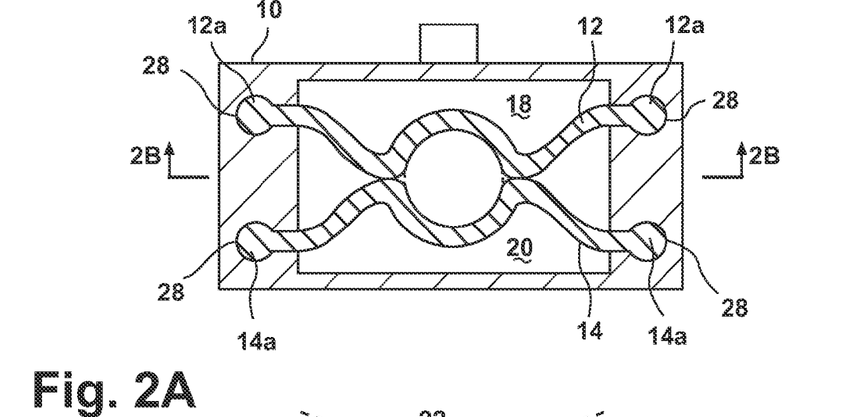
FIGS. 2A and 2B illustrate the first embodiment, when suction is applied FIG. 2A being the transverse section along lines 2A-2A in FIG. 2B, FIG. 2B being a longitudinal section along lines 2B-2B in FIG. 2A.
Figure 2B:
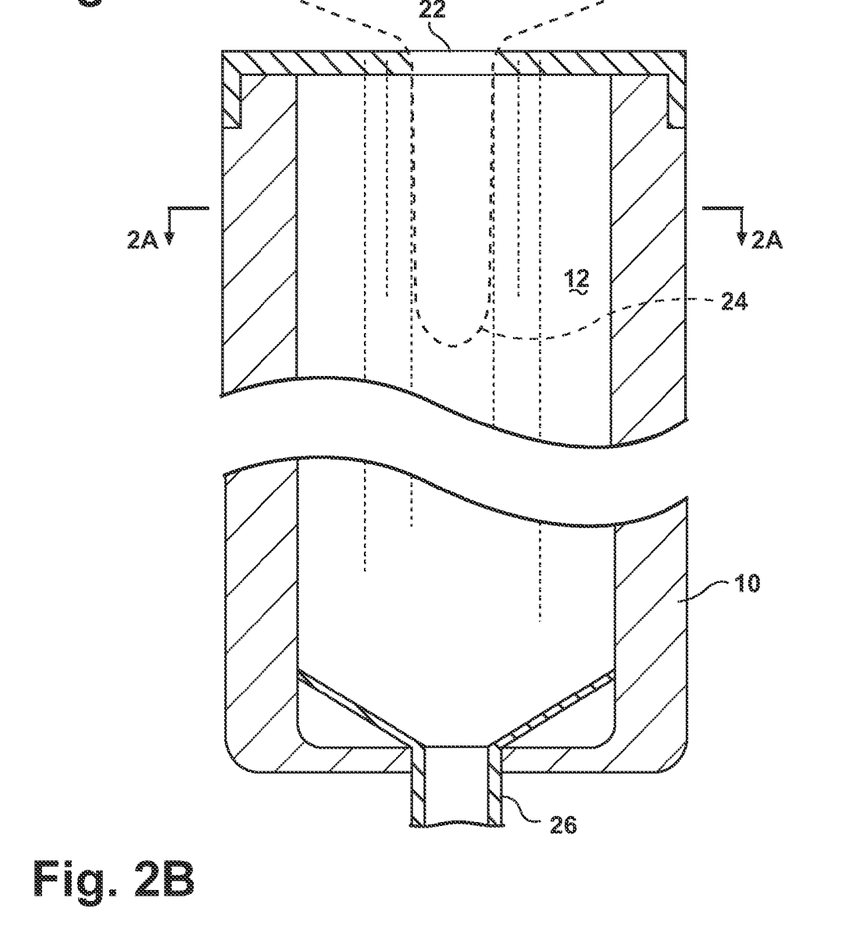

When suction is applied to the outlet 26, thereby reducing the pressure in the space 16 relative to the spaces 18, 20, the membranes 12, 14 will be deformed onto the teat, as illustrated in FIGS. 2A and 2B. The space 16 is closed around the teat, thereby causing milk to be expressed from the teat. The milk then passes out of the outlet 26. Due to the fact that the membranes 12, 14 are under transverse tension, they will close around the barrel of the teat, as well as the end of the teat itself. Thus, unlike the known liner arrangement, the present invention exerts pressure on the teat barrel.

The teat is thus massaged all over, not just at its end, making the action more like the sucking of the calf.

In the second embodiment, illustrated in FIGS. 3A, 3B, 4A and 4B, there are three membranes 40, 42, 44 within a hollow triangular body 46. As can be seen from FIG. 3A, the membranes 40, 42, 44 are joined at their longitudinal edges to define a space 48 therebetween which is triangular in transverse section. Beads 50 are provided along the longitudinally extending joins of the membranes, 40 42, 44, which beads 50 are received in corresponding recesses 52 in the body 46. Again, as in the first embodiment, by making the spacing of the recesses 52 greater than the relaxed spacing of the beads 50, the membranes, 40, 42, 44 will be put under transverse tension when they are mounted in the body 46.

Figure 3A:
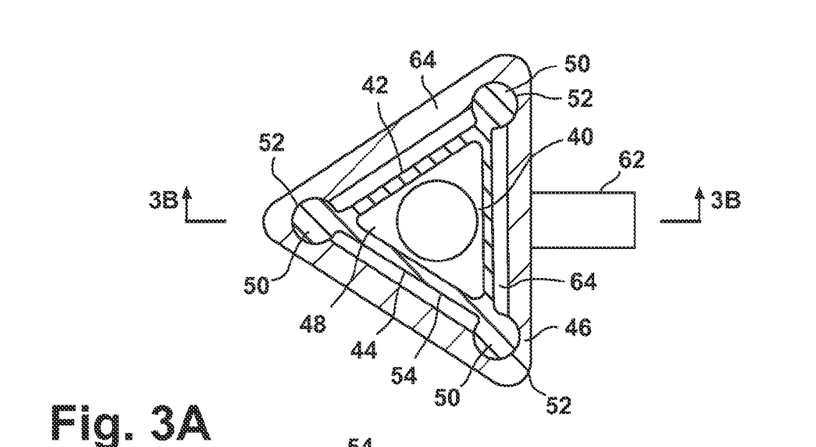
FIGS. 3A and 3B show the second embodiment of the present invention, FIG. 3A being a transverse sectional view along the line 3A-3A in FIG. 3B, and FIG. 3B being a longitudinal sectional view on the line 3B-3B in FIG. 3A.
Figure 3B:
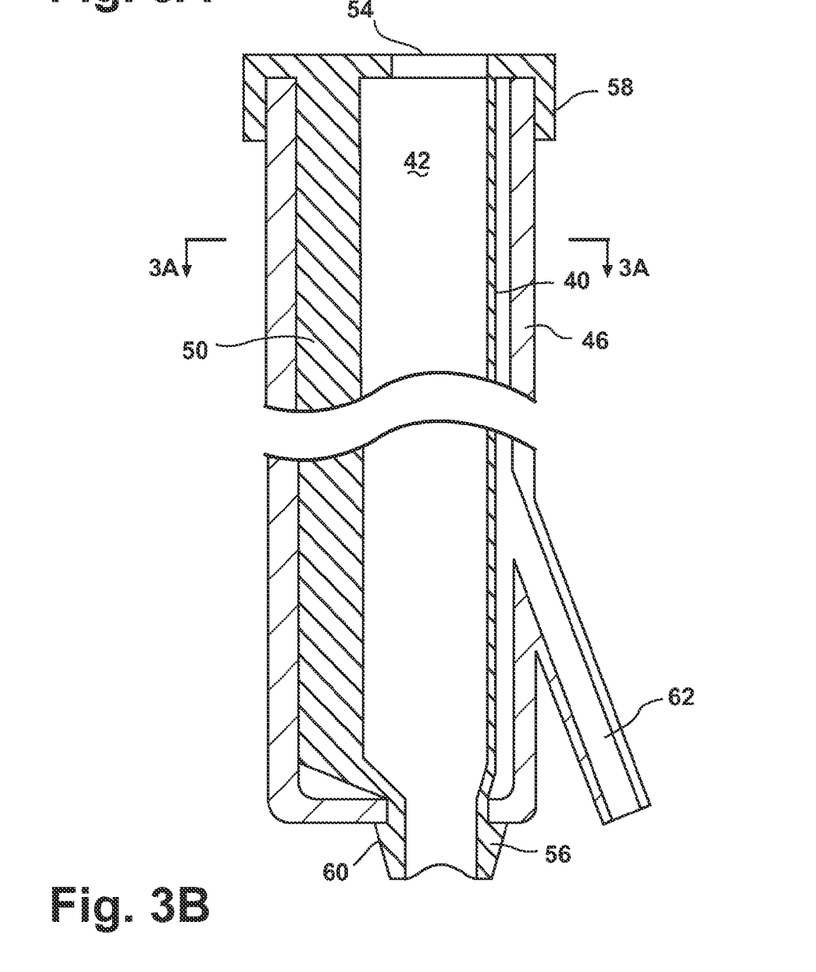

Again, as in the first embodiment, the body 46 has an opening 54 into which the teat is received so that the teat lies within space 48. An outlet 56 is provided at the end of the body 46 remote from the opening 54 to which suction is applied.

Note that in this second embodiment the structure defined by the membranes 40, 42, 44 has an upper flange 58 which fits over the top of the body 46, and the suction outlet 56 is integral with the membranes 40, 44, 44 and has a further flange 60 fitting over the bottom of the body 46. Thus, in such arrangement it is possible for the membranes 40, 42, 44 to be under longitudinal tension (i.e. in the axial direction of the teat) as well as under transverse tension. Moreover, in the second embodiment, there is an inlet 62 communicating with the spaces 64 between the membranes 40, 42, 44 and the body 46, to enable an over-pressure to be applied to the outsides of the membranes 40, 42, 44. Indeed, it may be possible for this embodiment to be operated only on over-pressure. In such a case no suction is applied to the outlet 56.

Figure 4A:
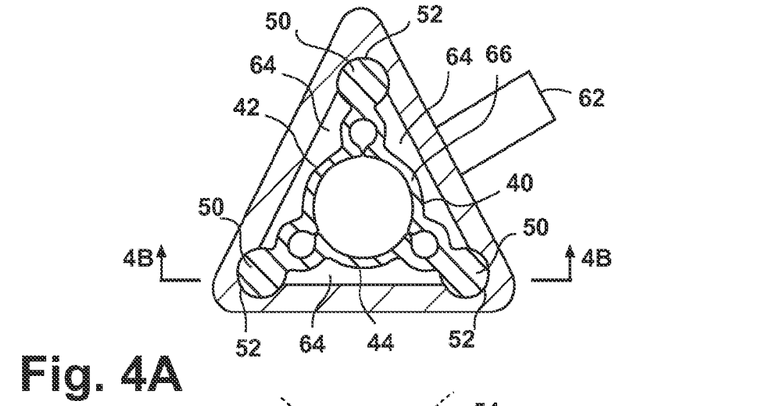
FIGS. 4A and 4B also show the second embodiment of the invention, when suction is applied, FIG. 4A being a transverse sectional view along the line 4A-4A in FIG. 4B, and FIG. 4B being a longitudinal sectional view along the line 4B-4B in FIG. 4A.
Figure 4B:
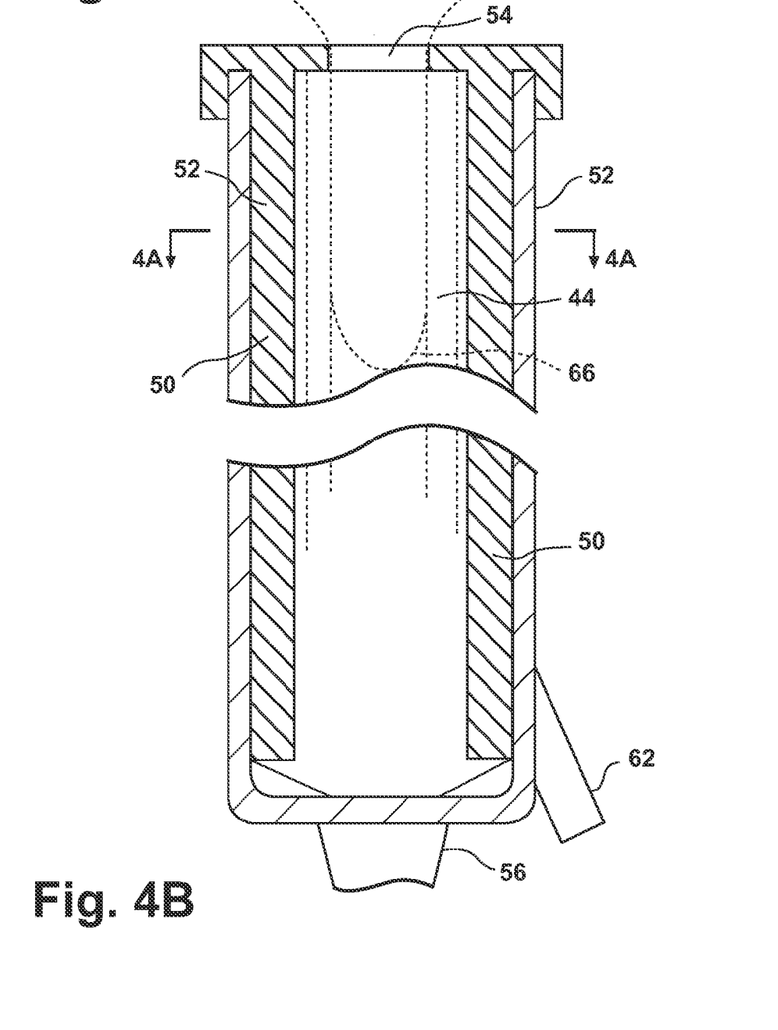

Again, FIGS. 4A and 4B illustrate the second embodiment when a teat 66 is inserted into the structure shown in FIGS. 3A and 3B, suction applied to the outlet 56, and an over-pressure applied to the inlet 62. The membranes, 40, 42, 44 close around the teat 66, closing the space 48. Thus, again, pressure is applied to the teat not only at the teat end, but along the barrel of the teat.

Thus, by putting the membranes under transverse tension, the pressures applied to the teat can be controlled so that pressure is applied over substantially the whole length of that part of the teat within the apparatus, thereby achieving an improved milking action, without exerting excessive forces on the end of the teat.

Figure 5A:
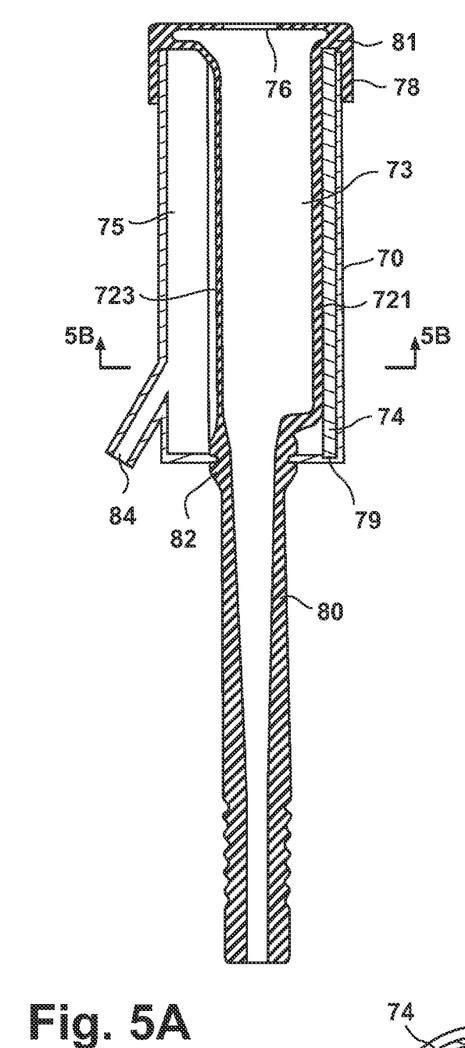
FIGS. 5A to 5D show a third embodiment of the invention, FIG. 5A being a transverse sectional view along the line 5A-5A in FIG. 5B, FIG. 5B being a longitudinal sectional view along the line 5B-5B in FIG. 5A, FIG. 5C being an enlarged view of the circular area of the membrane attachment in FIG. 5B, and FIG. 5D being an exploded transverse sectional view of the liner separated from the outer body.
Figure 5B:
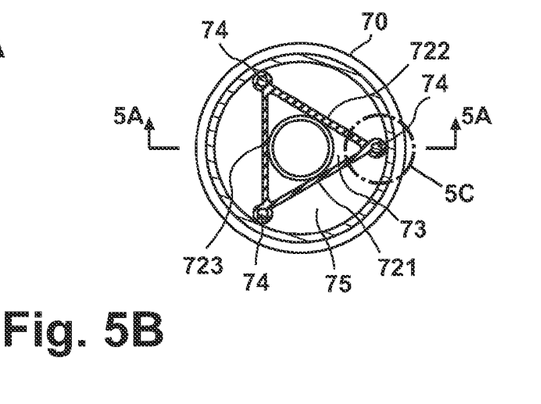
Figure 5C:
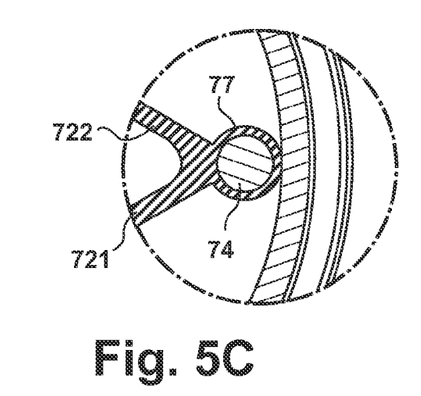
Figure 5D:
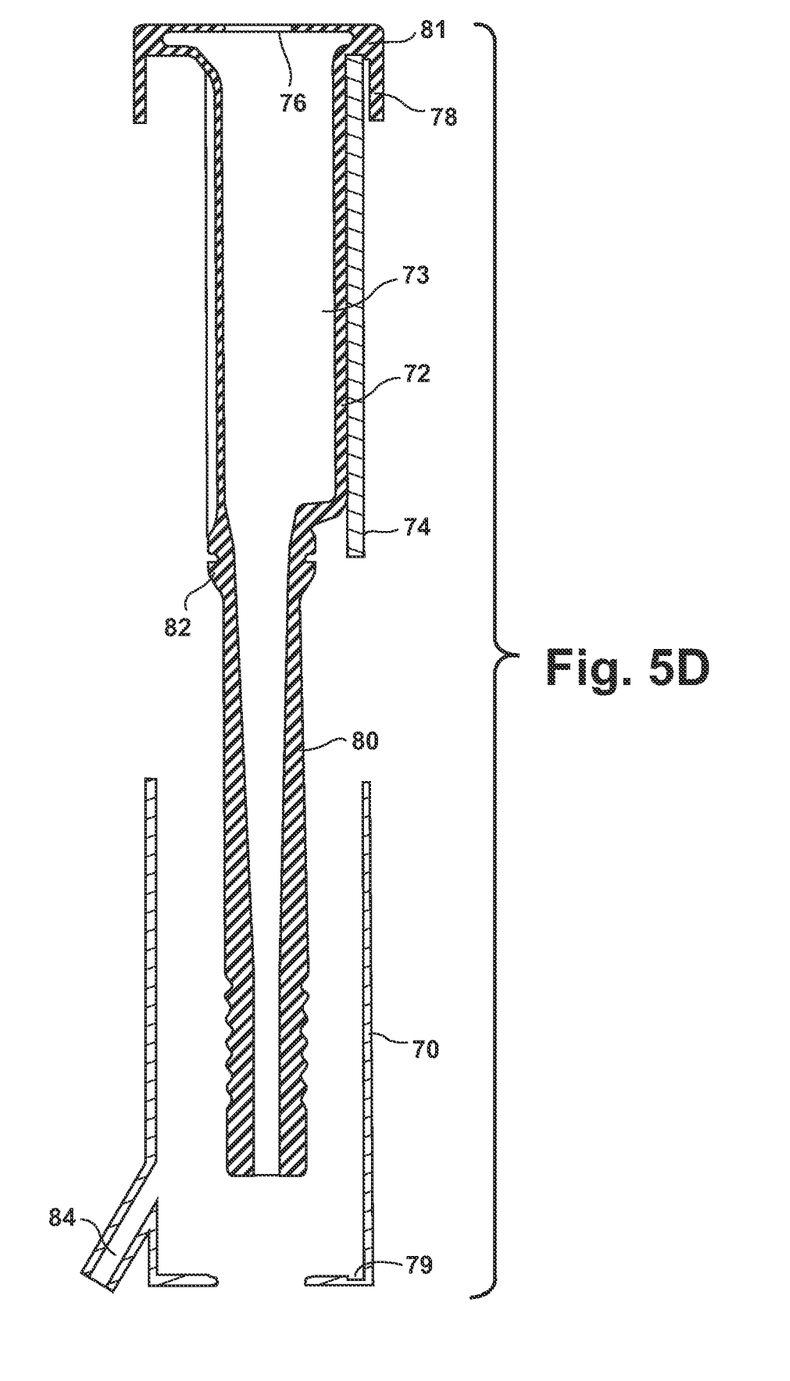

FIGS. 5A to 5D illustrate a third embodiment of the invention. In this embodiment, the liner is attached within the outer body 70 in such a way that there is no contact between the inside side surfaces of the outer body 70 and the liner. Similar to FIGS. 3 and 4, FIG. 5B shows that the liner in the third embodiment has three membranes 721, 722, 723 arranged in a triangular cross section. The membranes, 721, 722, 723 extend between upstanding rods 74 which are mounted in notches 79 formed on the base of the outer base 724 and extend up into corresponding notches 81 in the liner itself. In FIG. 5, the liner is moulded in one piece, i.e. the membrane is joined and moulded around each rod 74, as shown in FIG. 5C, where a skin 77 of resilient material surrounds the rod 74 and attaches to the membrane 721, 722. The membranes therefore define a space 73 within them in which the teat (not shown) is receivable through opening 76. As before, suction can be applied to space 73 through tube 80.

By spacing the membranes 721, 722, 723 away from the inside side surfaces of the outer body 70, a common region 75, i.e. a region having the same pressure, surrounds all of the membranes. This makes it easier to apply a constant overpressure, since whatever pressure is applied through inlet 84 will be experienced throughout common region 75 and therefore on all of the outer surfaces of the membranes 721, 722, 723. Similarly to FIG. 4, the common region 75 is sealed at the top and bottom of the outer body by a flanges 78, 82 on the outer body 70.

Figure 6A:
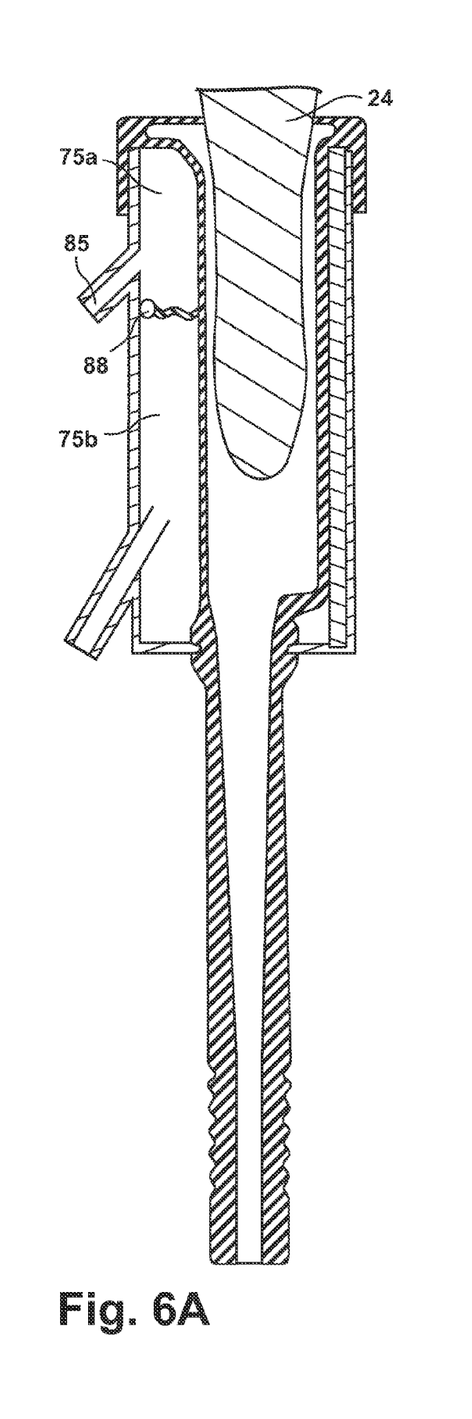
FIGS. 6A and 6B show transverse sectional views of a fourth embodiment of the invention, FIG. 6A showing a state where there is no pressure difference, and FIG. 6B showing a state where there is a pressure difference.
Figure 6B:
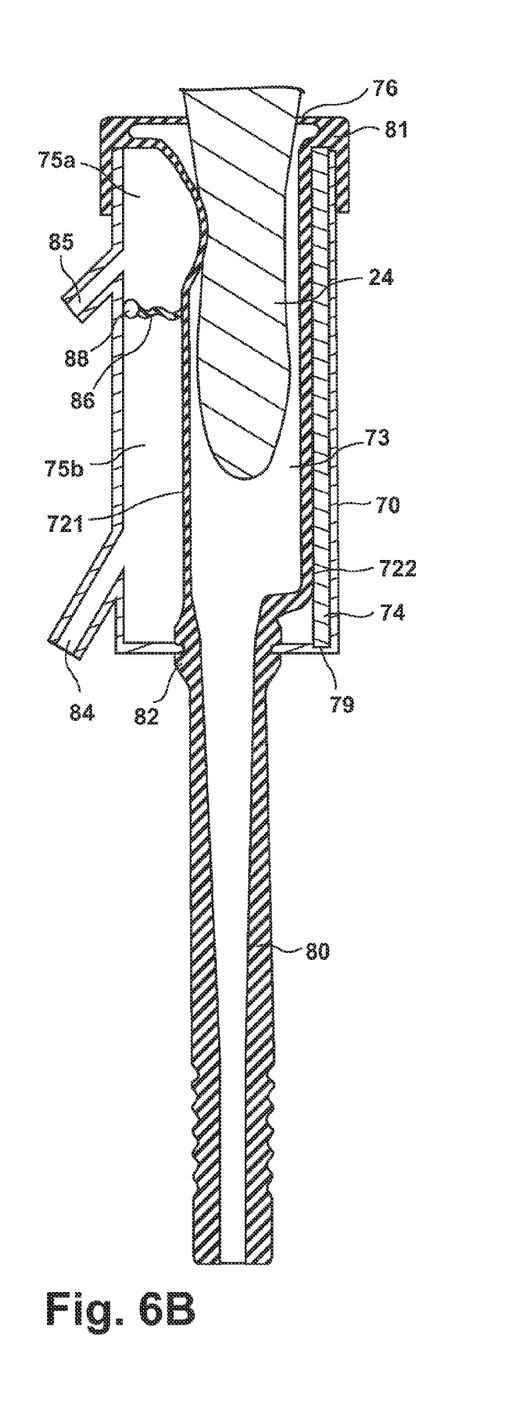

FIGS. 6A and 6B illustrate a fourth embodiment, which is a development of the third embodiment. Features in common with FIG. 5 have been given the same reference numerals and are not described again. In addition, FIGS. 6A and 6B divide the common region 75 into separate regions 75a, 75b. This division is achieved by providing a transverse webbing 86 around the outer surface of the liner (i.e. the outer surfaces of the membranes 721, 722, 723). The transverse webbing 86 is then attached to the inner surface of the outer body 70 using a clamp 88. When attached in this way, the transverse webbing 86 separates (seals) the common region 75 shown in FIG. 5 into two axially separated chambers 75a, 75b. Whilst FIGS. 6A and 6B illustrate two chambers 75a, 75b, three or more chambers may be used. Each chamber is provided with its own pressure input. Thus, chamber 75b may be pressurised via inlet 84, whereas chamber 75a is pressurised by a separate inlet 85. As before, suction is applied to the interior space 73 defined by the membranes, 721, 722, 723 via tub 80.

In the arrangement shown in FIGS. 6A and 6B, the action of each chamber 75a, 75b on the inserted teat 24 may be independently controllable.

Thus, in use, the teat 24 is inserted when no pressure is applied to the chambers 75a, 75b, as shown in FIG. 6A. Then, pressure is applied via inlet 85 to the upper chamber 75a, which closes on the teat 24. This closes the liner around the upper part of the teat 24 and in doing so protects the part of the teat outside the opening 76 from experiencing large pressure differentials.

Subsequently, the lower chamber 75b is given an overpressure and closes around the lower part of the teat 24. Both chambers 75a, 75b may then be released simultaneously. This sequence is then repeated to simulate the peristaltic motion effected by a suckling calf.

Figure 7A:
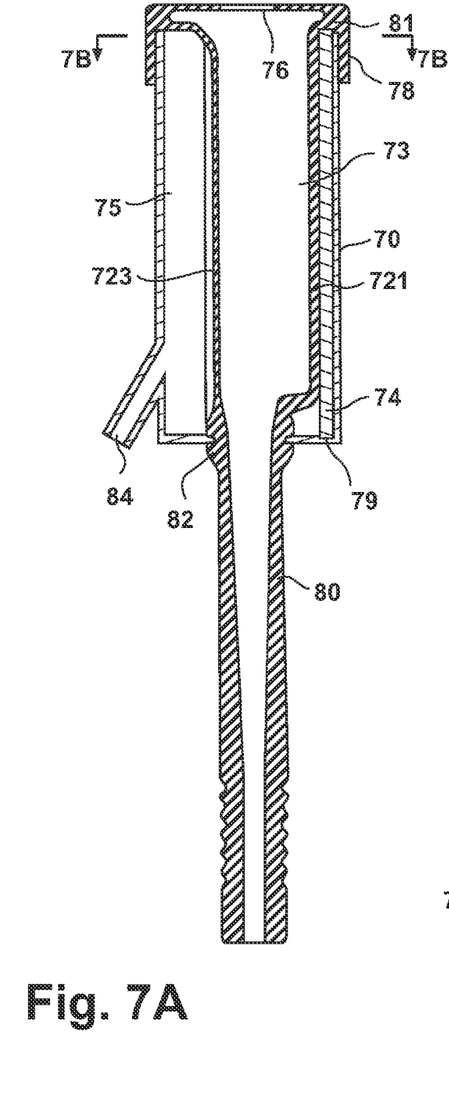
FIGS. 7A, 7B and 7C show a fifth embodiment of the invention, FIG. 7A being a transverse sectional view along the line 7A-7A in FIG. 7B, FIG. 7B being a longitudinal cross-section along the line 7B-7B in FIG. 7A, and FIG. 7C being an enlarged view of the area in the circle of the membrane attachment in FIG. 7B.
Figure 7B:
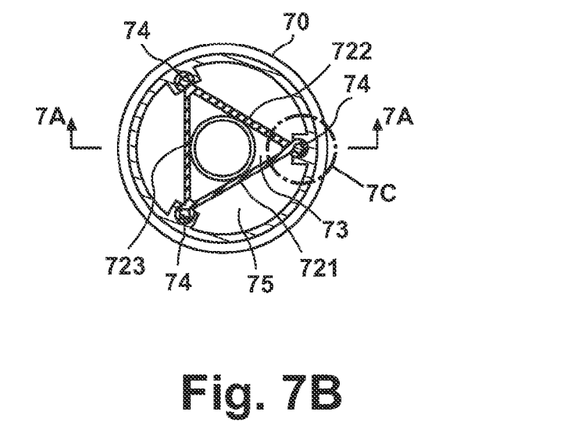
Figure 7C:
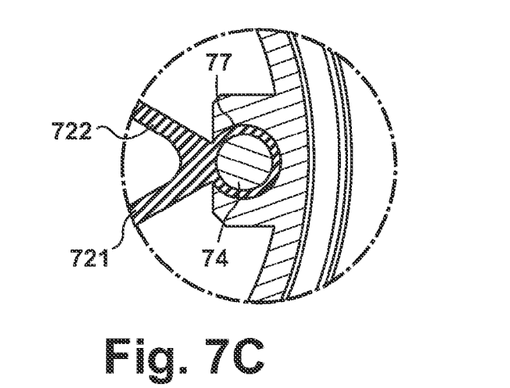

FIGS. 7A to 7C show a fifth embodiment of the invention, which resembles the embodiment shown in FIGS. 5A to 5D. The same reference numbers are used for corresponding parts, and these are not described again. FIG. 7C shows a different type of attachment at the top (upper) end of rod 74. A protruding jaw 71 extends radially inwards from the interior wall of the outer body 70 and captures the rod 74, thereby holding it securely in place.

What is claimed is:

1. Apparatus for removing milk from an animal teat having an end and a barrel, comprising:
    an outer body having an opening therein into which the teat is insertable in a first direction;
    at least two resilient membranes within the body, the membranes forming a space therebetween into which the teat is receivable when it is inserted into the opening, the membranes are transversely stretched to place them under tension in a direction transverse to said first direction when there is the same pressure across the membranes; and
    a pressure generating device for applying a pressure difference across the membranes to reduce the space between the at least two membranes;
    whereby forces exerted by the application of the pressure difference across the membranes on the end of the teat is reduced, yet a useful massage pressure is applied to the barrel of the teat when the differential pressure is applied across the membranes.

2. Apparatus according to claim 1, wherein the space formed by the membranes is a closed space sealed within the outer body.

3. Apparatus according to claim 1, wherein the membranes extend between fixed attachments mounted within the outer body.

4. Apparatus according to claim 3, wherein the outer body has interior walls and the attachments are adjacent to portions of the interior walls and are spaced transversely away from the adjacent portions of the interior walls of the outer body.

5. Apparatus according to claim 3, wherein the attachments are rods extending in the first direction, the resilient membranes being transversely stretched between rods.

6. Apparatus according to claim 1, wherein the resilient membranes are also under tension in the first direction when there is the same pressure said across the membranes.

7. Apparatus according to claim 1 having three membranes joined together to form a triangular configuration when viewed in cross-section.

8. Apparatus according to claim 1, wherein the pressure generating device is arranged to provide at least one of suction to the space between the membranes and an over-pressure to a region outside the membranes and inside the outer body.

9. Apparatus according to claim 1, wherein the average thickness of the membranes arranged to contact the teat is less than 1.5 mm.

10. Apparatus according to claim 1, wherein the average shear modulus of the membranes arranged to contact the teat is less than 0.8 $MNm^{-2}$.

11. Apparatus according to claim 1, wherein at least one of the thickness and shear modulus of the membranes arranged to contact the teat vary in the first direction along the membranes.

12. Apparatus according to claim 1, wherein each membrane is divided into two or more sub-membranes so that the membranes form a set of chambers surrounding said space in which the teat is receivable.

13. Apparatus according to claim 12, wherein the pressure generating device is arranged to provide an independently controllable pressure difference at each chamber.

14. Apparatus according to claim 12, wherein the membranes are divided to form a set of two or more chambers along the first direction.

15. Apparatus according to claim 12 having one or more transverse resilient webs extending between each membrane and the inside surface of the outer body to divide the region outside the membranes and inside the outer body into a plurality of axially spaced chambers.

16. Apparatus according to claim 12, wherein the pressure generating device is arranged to provide an overpressure to each chamber.

17. Apparatus for removing milk from the teat of an animal, comprising:
    an outer body having interior walls defining an opening therein into which a teat is insertable in a first direction;
    at least two membranes forming a space therebetween into which the teat is receivable when it is inserted into the opening; and
    a pressure generating device for applying a pressure difference across the membranes,
    wherein the membranes extend between attachment rods which are mounted within the outer body adjacent to portions of the interior walls and extend substantially in the first direction, the rods being spaced transversely away from the adjacent portions of the interior walls of the outer body along a majority of their length; and
    wherein the resilient membranes are transversely stretched to place them under tension in a direction transverse to the first direction when there is the same pressure across the membranes.

18. A method of removing milk from a teat of an animal, comprising:
    providing an outer body having an opening into which the teat is insertable in a first direction;
    providing at least two resilient membranes within the body, the membranes forming a space therebetween;
    transversely stretching said membranes to place them in tension in a direction transverse to the first direction when there is the same pressure across said membranes;
    inserting the teat in the first direction into the space formed between membranes housed in the outer body; and
    generating a pressure difference across said membranes to cause the membranes to fall onto the teat.

19. A method according to claim 18, wherein each membrane is divided into two or more sub-membranes so that the membranes form a set of chambers surrounding said space in which the teat is received, and the method includes sequentially generating a pressure difference at each chamber so that the sub-membranes press against the teat in sequence.

* * * * *